United States Patent
Pierce et al.

(10) Patent No.: US 11,409,722 B2
(45) Date of Patent: *Aug. 9, 2022

(54) DATABASE LIVE REINDEX

(71) Applicant: Palantir Technologies Inc., Palo Alto, CA (US)

(72) Inventors: Alan Pierce, Palo Alto, CA (US); Brian Dorne, Menlo Park, CA (US); Michael Glazer, San Francisco, CA (US); Derek Rabideau, Neenah, WI (US); Richard Allen Ducott, III, London (GB); David Karesh, Palo Alto, CA (US); Dylan Davis, Palo Alto, CA (US); Matthew Dailey, San Francisco, CA (US); Hongyi Yao, Mountain View, CA (US); Daniel Robinson, Menlo Park, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 309 days.

This patent is subject to a terminal disclaimer.

(21) Appl. No.: 16/557,583

(22) Filed: Aug. 30, 2019

(65) Prior Publication Data

US 2019/0384751 A1    Dec. 19, 2019

Related U.S. Application Data

(63) Continuation of application No. 14/837,951, filed on Aug. 27, 2015, now Pat. No. 10,402,385.

(51) Int. Cl.
*G06F 16/22*    (2019.01)
*G06F 16/245*    (2019.01)
(Continued)

(52) U.S. Cl.
CPC ...... *G06F 16/2228* (2019.01); *G06F 16/2365* (2019.01); *G06F 16/245* (2019.01); *G06F 16/951* (2019.01)

(58) Field of Classification Search
CPC .............. G06F 16/2228; G06F 16/245; G06F 16/2365; G06F 16/951
(Continued)

(56) References Cited

U.S. PATENT DOCUMENTS 5,724,575 A    3/1998    Hoover et al.
5,872,973 A    2/1999    Mitchell et al.
(Continued)

FOREIGN PATENT DOCUMENTS

EP    2555126    2/2013
EP    2863326    4/2015
EP    2891992    7/2015

OTHER PUBLICATIONS

Antoshenkov, Gennady, "Dictionary-Based Order-Preserving String Compression," The VLDB Journal, 1997, vol. 6, pp. 26-39.
(Continued)

*Primary Examiner* — Hosain T Alam
*Assistant Examiner* — Nicholas E Allen
(74) *Attorney, Agent, or Firm* — Hickman Becker Bingham Ledesma LLP

(57) ABSTRACT

Systems and methods for live reindexing include receiving, at a dispatch server, a request to reindex a database, wherein, at the time the request to reindex is received, the dispatch server is configured to send queries for information in the database to a first index server, the first index server comprising a first index of information in the database. The systems and methods further include, responsive to receiving the request to reindex and while the database is live, generating a second index of the information in the database,
(Continued)

storing the second index at a second index server, and configuring the dispatch server to use the second index server as a live index server and to no longer use the first index server as a live index server.

20 Claims, 4 Drawing Sheets

(51) Int. Cl.
    *G06F 16/951* (2019.01)
    *G06F 16/23* (2019.01)

(58) Field of Classification Search
    USPC ......................................................... 707/696
    See application file for complete search history.

(56) References Cited

U.S. PATENT DOCUMENTS

| | | | |
|---|---|---|---|
| 5,897,636 | A | 4/1999 | Kaeser |
| 6,073,129 | A | 6/2000 | Levine et al. |
| 6,161,098 | A | 12/2000 | Wallman |
| 6,243,717 | B1 | 6/2001 | Gordon et al. |
| 6,304,873 | B1 | 10/2001 | Klein et al. |
| 6,366,933 | B1 | 4/2002 | Ball et al. |
| 6,418,438 | B1 | 7/2002 | Campbell |
| 6,510,504 | B2 | 1/2003 | Satyanarayana |
| 6,560,620 | B1 | 5/2003 | Ching |
| 6,574,635 | B2 | 6/2003 | Stauber et al. |
| 6,745,382 | B1 | 6/2004 | Zothner |
| 6,976,210 | B1 | 12/2005 | Silva et al. |
| 7,058,648 | B1 | 6/2006 | Lightfoot et al. |
| 7,111,231 | B1 | 9/2006 | Huck et al. |
| 7,461,158 | B2 | 12/2008 | Rider et al. |
| 7,725,530 | B2 | 5/2010 | Sah et al. |
| 7,725,728 | B2 | 5/2010 | Ama et al. |
| 7,730,082 | B2 | 6/2010 | Sah et al. |
| 7,730,109 | B2 | 6/2010 | Rohrs et al. |
| 7,962,495 | B2 | 6/2011 | Jain et al. |
| 8,041,714 | B2 | 10/2011 | Aymeloglu et al. |
| 8,112,425 | B2 | 2/2012 | Baum et al. |
| 8,126,848 | B2 | 2/2012 | Wagner |
| 8,185,819 | B2 | 5/2012 | Sah et al. |
| 8,443,013 | B1 | 5/2013 | Lin |
| 8,504,542 | B2 | 8/2013 | Chang et al. |
| 8,676,857 | B1 | 3/2014 | Adams et al. |
| 8,719,225 | B1 | 5/2014 | Rath |
| 8,930,331 | B2 | 1/2015 | McGrew et al. |
| 9,037,825 | B1 | 5/2015 | Donlan |
| 9,043,696 | B1 | 5/2015 | Meiklejohn et al. |
| 9,053,167 | B1 | 6/2015 | Swift |
| 9,116,975 | B2 | 8/2015 | Shankar et al. |
| 2001/0051949 | A1 | 12/2001 | Carey et al. |
| 2002/0091694 | A1 | 7/2002 | Hrle et al. |
| 2003/0105759 | A1 | 6/2003 | Bess et al. |
| 2003/0115481 | A1 | 6/2003 | Baird et al. |
| 2003/0120675 | A1 | 6/2003 | Stauber et al. |
| 2003/0212718 | A1 | 11/2003 | Tester |
| 2003/0225755 | A1 | 12/2003 | Iwayama et al. |
| 2003/0229848 | A1 | 12/2003 | Arend et al. |
| 2004/0111410 | A1 | 6/2004 | Burgoon et al. |
| 2004/0117345 | A1 | 6/2004 | Bamford et al. |
| 2004/0117387 | A1 | 6/2004 | Civetta et al. |
| 2004/0148301 | A1 | 7/2004 | McKay et al. |
| 2004/0225865 | A1 | 11/2004 | Cox |
| 2005/0097441 | A1 | 5/2005 | Herbach et al. |
| 2005/0108231 | A1 | 5/2005 | Findleton et al. |
| 2005/0114763 | A1 | 5/2005 | Nonomura et al. |
| 2005/0289524 | A1 | 12/2005 | McGinnes |
| 2006/0074881 | A1 | 4/2006 | Vembu et al. |
| 2006/0080316 | A1 | 4/2006 | Gilmore et al. |
| 2006/0116991 | A1 | 6/2006 | Calderwood |
| 2006/0161558 | A1 | 7/2006 | Tamma et al. |
| 2006/0218206 | A1 | 9/2006 | Bourbonnais et al. |
| 2006/0218491 | A1 | 9/2006 | Grossman et al. |
| 2006/0242630 | A1 | 10/2006 | Koike et al. |
| 2006/0253502 | A1 | 11/2006 | Raman et al. |
| 2006/0265397 | A1 | 11/2006 | Bryan et al. |
| 2007/0050429 | A1 | 3/2007 | Goldring et al. |
| 2007/0061266 | A1 | 3/2007 | Moore |
| 2007/0061487 | A1 | 3/2007 | Moore et al. |
| 2007/0143253 | A1 | 6/2007 | Kostamaa et al. |
| 2007/0233756 | A1 | 10/2007 | D'Souza et al. |
| 2007/0271317 | A1 | 11/2007 | Carmel |
| 2008/0015970 | A1 | 1/2008 | Brookfield et al. |
| 2008/0104149 | A1 | 5/2008 | Vishniac et al. |
| 2008/0195672 | A1 | 8/2008 | Hamel et al. |
| 2008/0270316 | A1 | 10/2008 | Guidotti et al. |
| 2008/0301378 | A1 | 12/2008 | Carrie |
| 2009/0031247 | A1 | 1/2009 | Walter et al. |
| 2009/0106308 | A1 | 4/2009 | Killian et al. |
| 2009/0164387 | A1 | 6/2009 | Armstrong et al. |
| 2009/0271435 | A1 | 10/2009 | Yako et al. |
| 2009/0313223 | A1 | 12/2009 | Rantanen |
| 2009/0313311 | A1 | 12/2009 | Hoffmann et al. |
| 2010/0036831 | A1 | 2/2010 | Vemuri et al. |
| 2010/0076939 | A1 | 3/2010 | Iwaki et al. |
| 2010/0082541 | A1 | 4/2010 | Kottomtharayil |
| 2010/0114817 | A1 | 5/2010 | Broeder et al. |
| 2010/0114831 | A1 | 5/2010 | Gilbert et al. |
| 2010/0138842 | A1 | 6/2010 | Balko et al. |
| 2010/0145909 | A1 | 6/2010 | Ngo |
| 2010/0161565 | A1 | 6/2010 | Lee et al. |
| 2010/0161688 | A1 | 6/2010 | Kesselman et al. |
| 2010/0191884 | A1 | 7/2010 | Holenstein et al. |
| 2010/0211550 | A1 | 8/2010 | Daniello et al. |
| 2010/0211618 | A1 | 8/2010 | Anderson et al. |
| 2010/0235606 | A1 | 9/2010 | Oreland et al. |
| 2010/0281013 | A1 | 11/2010 | Graefe |
| 2010/0283787 | A1 | 11/2010 | Hamedi et al. |
| 2010/0325581 | A1 | 12/2010 | Finkelstein et al. |
| 2011/0029498 | A1 | 2/2011 | Ferguson et al. |
| 2011/0173619 | A1 | 7/2011 | Fish |
| 2011/0184813 | A1 | 7/2011 | Barne et al. |
| 2011/0191347 | A1 | 8/2011 | Maddali |
| 2011/0258158 | A1 | 10/2011 | Resende et al. |
| 2011/0258242 | A1 | 10/2011 | Eidson et al. |
| 2011/0264668 | A1 | 10/2011 | Hacker |
| 2011/0270812 | A1 | 11/2011 | Ruby |
| 2012/0013684 | A1 | 1/2012 | Lucia |
| 2012/0066228 | A1 | 3/2012 | Charboneau |
| 2012/0072825 | A1 | 3/2012 | Sherkin et al. |
| 2012/0109933 | A1 | 5/2012 | Kravets |
| 2012/0150791 | A1 | 6/2012 | Willson |
| 2012/0159307 | A1 | 6/2012 | Chung et al. |
| 2012/0166407 | A1 | 6/2012 | Lee |
| 2012/0185608 | A1 | 7/2012 | McGowan |
| 2012/0197868 | A1 | 8/2012 | Fauser |
| 2012/0221528 | A1* | 8/2012 | Renkes .................... G06F 16/00 707/674 |
| 2012/0284250 | A1* | 11/2012 | Downum .............. G06F 16/951 707/706 |
| 2012/0284258 | A1 | 11/2012 | Liu |
| 2012/0330908 | A1 | 12/2012 | Stowe et al. |
| 2013/0024440 | A1 | 1/2013 | Dimassimo |
| 2013/0036346 | A1 | 2/2013 | Cicerone |
| 2013/0073602 | A1 | 3/2013 | Medway |
| 2013/0097130 | A1 | 4/2013 | Bingol et al. |
| 2013/0311428 | A1 | 11/2013 | Patel |
| 2013/0318060 | A1 | 11/2013 | Chang et al. |
| 2014/0006411 | A1 | 1/2014 | Boldyrev |
| 2014/0046949 | A1 | 2/2014 | Bloomfield |
| 2014/0149272 | A1 | 5/2014 | Hirani et al. |
| 2014/0188840 | A1 | 7/2014 | Agarwal |
| 2014/0201179 | A1 | 7/2014 | Chang |
| 2014/0278807 | A1 | 9/2014 | Bohacek |
| 2014/0279881 | A1 | 9/2014 | Tan |
| 2014/0304266 | A1 | 10/2014 | Leuoth |
| 2014/0344231 | A1 | 11/2014 | Stowe et al. |
| 2014/0351203 | A1* | 11/2014 | Kunnatur ................ G06F 16/22 707/609 |
| 2015/0106347 | A1 | 4/2015 | McGrew et al. |
| 2015/0112956 | A1 | 4/2015 | Chang et al. |
| 2015/0117631 | A1 | 4/2015 | Tuchman |

(56) References Cited

U.S. PATENT DOCUMENTS

| | | |
|---|---|---|
| 2015/0134796 A1 | 5/2015 | Theimer |
| 2015/0186429 A1 | 7/2015 | Chen |
| 2015/0205588 A1 | 7/2015 | Bates |
| 2015/0220583 A1 | 8/2015 | Teletia |
| 2015/0227295 A1 | 8/2015 | Meiklejohn et al. |
| 2015/0242413 A1* | 8/2015 | Goo .................... G06F 16/2272 707/613 |

OTHER PUBLICATIONS

"Apache HBase," <http://hbase.apache.org/> printed Sep. 14, 2011 in 1 page.

"BackTult—JD Edwards One World Version Control System," printed Jul. 23, 2007 in 1 page.

Baker et al., "Megastore: Providing Scalable, Highly Available Storage for Interactive Services," 5th Biennial Conference on Innovative Data Systems Research (CIDR'11), Jan. 9-12, 2011, Asilomar, California, pp. 12.

Bernstein et al., "Hyder—A Transactional Record Manager for Shared Flash," 5th Biennial Conference on Innovative Data Systems Research (CIDR '11), Jan. 9-12, 2011, Asilomar, California, pp. 12.

Chang et al., "Bigtable: A Distributed Storage System for Structured Data", Google, Inc., OSDI'06: Seventh Symposium on Operating System Design and Implementation, Seattle, WA, Nov. 2006, pp. 14.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Devanbu et al., "Authentic Third-party Data Publication," 2000, pp. 19, http://www.cs.ucdavis.edu/~devanbu/authdbpub.pdf.

Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.

Elmasri et al., "Fundamentals of Database Systems," 2004, Fourth Edition, pp. 455-491.

Hogue et al., "Thresher: Automating the Unwrapping of Semantic Content from the World Wide Web," 14th International Conference on World Wide Web, WWW 2005: Chiba, Japan, May 10-14, 2005, pp. 86-95.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontoloty Management System (Design)," Information Societies Technology Programme, Jan. 10, 2002, pp. 1-27.

Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.

Miklau et al., "Securing History: Privacy and Accountability in Database Systems," 3rd Biennial Conference on Innovative Data Systems Research (CIDR), Jan. 7-10, 2007, Asilomar, California, pp. 387-396.

Niepert et al., "A Dynamic Ontology for a Dynamic Reference Work", Joint Conference on Digital Libraries, Jun. 17-22, 2007, Vancouver, British Columbia, Canada, pp. 1-10.

Nierman, "Evaluating Structural Similarity in XML Documents," 2002, 6 pages.

Peng et al., "Large-scale Incremental Processing Using Distributed Transactions and Notifications" Proceedings of the 9th USENIX Symposium on Operating Systems Design and Implementation, USENIX, 2010, pp. 14.

"The Apache Cassandra Project," <http://cassandra.apache.org/> printed Sep. 14, 2011 in 3 pages.

Thomson et al., "The Case for Determinism in Database Systems," The 36th International Conference on Very Large Data Bases, Sep. 13-17, 2010, Singapore, Proceedings of the VLDB Endowment, vol. 3, No. 1, pp. 11.

Wikipedia, "Federated Database System," Sep. 7, 2013, retrieved from the internet on Jan. 27, 2015 http://en.wikipedia.org/w/index.php?title=Federated_database_system&oldid=571954221.

Wollrath et al., "A Distributed Object Model for the Java System," Conference on Object-Oriented Technologies and Systems, Jun. 17-21, 1996, pp. 219-231.

Yang et al., "HTML Page Analysis Based on Visual Cues," 2001, pp. 859-864.

Official Communication for European Patent Application No. 14189344.6 dated Feb. 20, 2015.

Official Communication for European Patent Application No. 14199182.8 dated Mar. 13, 2015.

U.S. Appl. No. 14/192,767, filed Feb. 27, 2014, Notice of Allowance, dated Dec. 16, 2014.

U.S. Appl. No. 13/826,228, filed Mar. 14, 2013, Notice of Allowance, dated Mar. 27, 2015.

U.S. Appl. No. 14/504,103, filed Oct. 1, 2014, Notice of Allowance, dated May 18, 2015.

U.S. Appl. No. 14/504,103, filed Oct. 1, 2014, First Office Action Interview, dated Mar. 31, 2015.

U.S. Appl. No. 14/451,221, filed Aug. 4, 2014, Ex Parte Quayle Action, mailed Apr. 6, 2015.

U.S. Appl. No. 14/580,218, filed Dec. 23, 2014, Office Action, dated Jun. 26, 2015.

U.S. Appl. No. 14/734,772, filed Jun. 9, 2015, First Office Action Interview, dated Jul. 24, 2015.

U.S. Appl. No. 14/451,221, filed Aug. 4, 2014, Notice of Allowance, dated Aug. 4, 2015.

U.S. Appl. No. 14/278,963, filed May 15, 2014, Final Office Action, dated Jan. 30, 2015.

U.S. Appl. No. 14/504,103, filed Oct. 1, 2014, First Office Action Interview, dated Feb. 5, 2015.

U.S. Appl. No. 14/837,951, filed Aug. 27, 2015, Final Office Action, dated Jan. 2, 2019.

U.S. Appl. No. 14/837,951, filed Aug. 27, 2015, First Office Action, dated Dec. 19, 2017.

U.S. Appl. No. 14/837,951, filed Aug. 27, 2015, Notice of Allowance, dated Apr. 17, 2019.

U.S. Appl. No. 14/837,951, filed Aug. 27, 2015, Office Action, dated May 3, 2018.

* cited by examiner

DATABASE LIVE REINDEX

BENEFIT CLAIM

This application claims the benefit 35 U.S.C. § 120 as a continuation of application Ser. No. 14/837,951, filed Aug. 27, 2015, the entire contents of which are hereby incorporated by reference for all purposes as if fully set forth herein. The applicants hereby rescind any disclaimer of claim scope in the priority applications or the prosecution history thereof and advise the USPTO that the claims in this application may be broader than any claim in the priority applications.

TECHNICAL FIELD

Some embodiments of the present invention relate generally to data modeling using computer systems, and more particularly, to a methodology for reindexing a database in a live environment.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computers are powerful tools for accessing and storing vast amounts of information. Computer databases are a common mechanism for storing information on computer systems. Databases can take many different forms. One typical database is a collection of tables having rows and columns of information. For example, a database table of employees may have a row for each employee, and the columns designating specifics about the employee, such as the employee's name, address, salary, etc.

One important aspect of databases is the speed at which they are able to retrieve information. The faster a given database is able to perform a search or retrieve requested information, the better user experience a user of the database will have. One way to improve the speed of a database is to create an index. Generally, an index is a data structure that improves the speed of retrieving data from the database at the cost of additional storage space. Improved methods relating to indexes may result in better searches, and are always needed.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for reindexing a database in a live environment. Specifically, in one embodiment, a dispatch server receives a request to reindex a database. At the time the request to reindex is received, the dispatch server is configured to send queries for information in the database to a first index server, the first index server comprising a first index of information in the database. In response to receiving the request to reindex and while the database is live, a second index of the information in the database is generated. The second index is stored at a second index server. The dispatch server is then configured to use the second index server as a live index server and to no longer use the first index server as a live index server.

Example System Implementation

Figure 1:
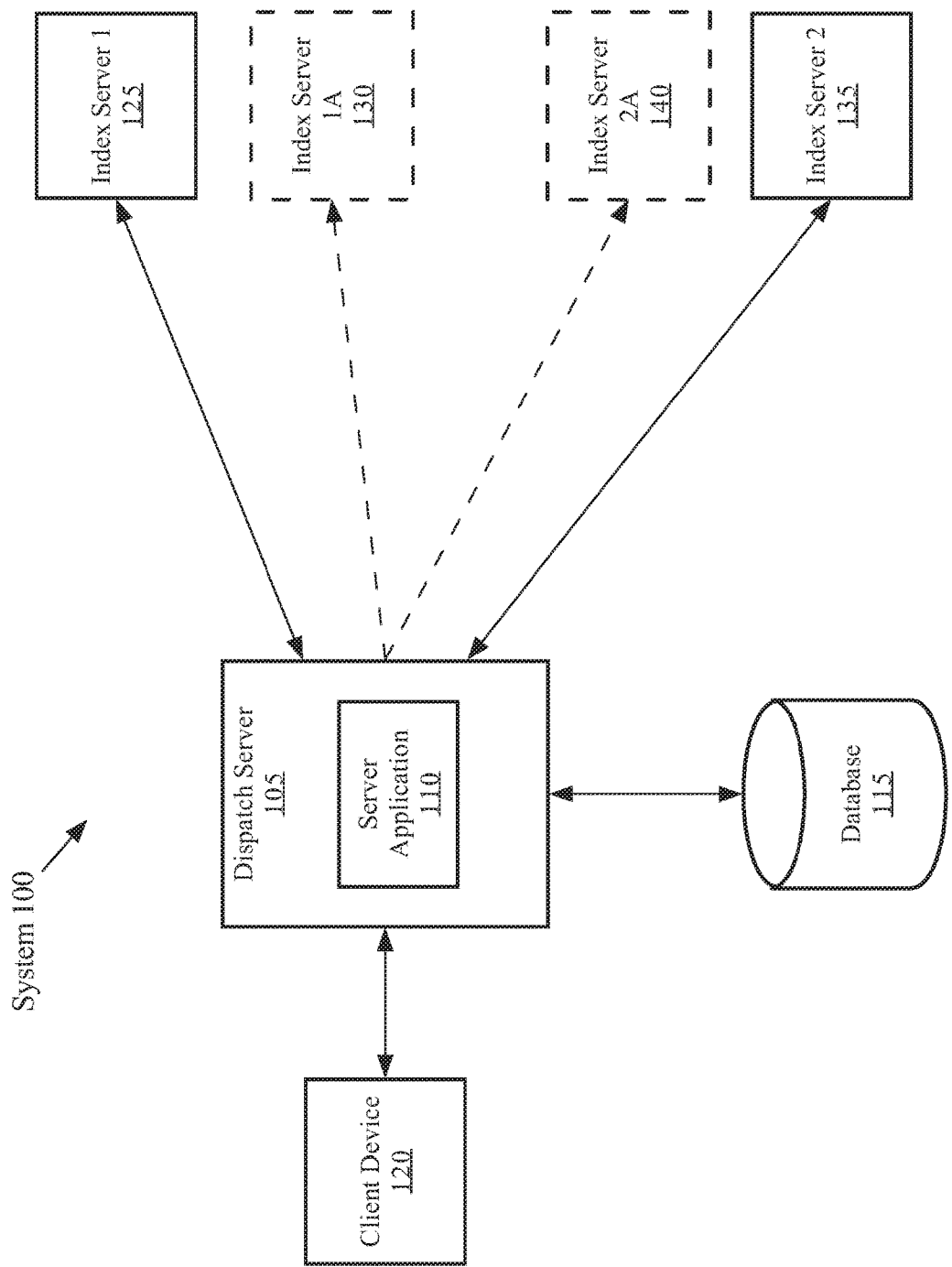
FIG. 1 shows a block diagram of a system in accordance with an embodiment of the invention.

FIG. 1 illustrates an example computer system 100 in which the techniques described may be practiced, according to some embodiments. System 100 is a computer-based system. The various components of system 100 are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. System 100 illustrates only one of many possible arrangements of components configured to execute the programming described herein. Other arrangements may include fewer or different components, and the division of work between the components may vary depending on the arrangement.

System 100 includes dispatch server 105, server application 110, database 115, client device 120, index server1 125, index server 1A 130, index server2 135, and index server 2A 140. Dispatch server 105 may be any kind of computing device including, but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Dispatch server 105 is communicatively connected, using wired and/or wireless connections, to database 115, client device 120, index server1 125, index server 1A 130, index server2 135, and index server 2A 140. Although a single dispatch server 105 is shown in FIG. 1, any number of dispatch servers 105 may be used. Additionally, one or more load balancers (not shown) may be used when there are multiple dispatch servers in use. In one embodiment, dispatch server 105 may execute any number of software applications, such as server application 110.

In one embodiment, server application 110 includes programming to access database 115, handle requests, generate indexes, and/or other actions related to database 115. Server application 110 may access database 115 in any suitable manner, such as using a database connector. Server application 110 includes programming to send requests to search and/or index servers, such as index server1 125 and/or index server2 135. The requests may be search requests from client devices for information that is locatable using the index server(s). The requests may be transparent to any client devices. In other words, the client device is not aware of where or how server application 110 obtains the answer to a request or query.

In one embodiment, server application 110 includes programming to reindex a live database by generating a new index. Server application 110 may receive a request to reindex a live database in any suitable manner. Once received, server application 110 queries the database and generates a new index. Preferably, because the database is live, the new index is generated slowly, to minimize any impact on database performance. For example, the request to generate a new index may specify a batch size and thread count. The batch size defines the size of blocks of data to be retrieved from the database, while the thread count refers to a number of processors or cores assigned to the process. Continuing the example, a batch size of 1000 and a thread count of 4 may not impact a database in a noticeable way, but will still allow a new index to be generated over time. Optionally, server application 110 may determine the batch size and/or thread count based on any suitable factors, such as available server and/or database capacity. Further, server application 110 may dynamically vary the batch size and/or thread count. Thus, for example, the batch size and thread count may increase at night, when fewer users are requesting information from the database. Regardless of the batch size and/or thread count, server application 110 iterates through all of the information in database 115. However, because the database is live, a complete iteration may not be possible until dispatch server is quiesced, as discussed below.

In one embodiment, server application 110 includes programming to save the newly generated index at a "shadow" index server. A shadow index server is not a live server. In other words, no search requests are sent to a shadow index server. Index servers, both live and shadow, are discussed in more detail below. Server application 110 may save a newly generated index as the new index is generated by one or more threads processing the information in the database that is being reindexed. Server application 110 may store the new index in any suitable manner or format. For example, rather than storing the new index in memory, and thereby occupying a potentially large amount of server capacity, server application 110 may store the new index in a commit log. Then, when the new index is ready for use, a server may read the commit log and generate an in memory representation of the new index based on the content of the commit log.

In one embodiment, server application 110 includes programming to quiesce, or pause, the dispatch server 105. While the dispatch server is quiesced, no information will be added to database 115, and server application 110 is able to complete the generation of a new index, such as by completing iteration though the information in database 115. Once the generation of a new index is completed, server application 110 reconfigures dispatch server 105 to send future search requests to the new index, thereby replacing the "old" live index server with a new index server (i.e., the shadow index server) featuring the newly generated index. Once reconfigured, server application 110 returns dispatch server 105 to a live state, and all new search requests will subsequently be directed to a live index server with the newly generated index.

In one embodiment, database 115 is any suitable storage device such as one or more hard disk drives, memories, or any other electronic digital data recording device configured to store data. Although database 115 is depicted as a single device in FIG. 1, database 115 may span multiple devices located in one or more physical locations. Additionally, in one embodiment, database 115 may be located on the same device(s) as dispatch server 105. Alternatively, database 115 may be located on a separate device(s) from dispatch server 105, or any other suitable component. Database 115 may store any type of information in any format. In one embodiment, database 115 is a "key-value" database. The term "key-value" is not meant to imply any particular database or database system, or imply any particular type of database or database system. Rather, "key-value" refers broadly to the general manner in which database 115 is presented to other components of FIG. 1. More specifically, a database management system may present a key-value abstraction of the underlying information of database 115 to other components of FIG. 1 through an Application Programming Interface (API). In one embodiment, database 115 uses a chronologically increasing data event ID number for each piece(s) of data added to the database, thereby allowing for easy iteration through the database by accessing each data event ID.

In one embodiment, database 115 is managed by a database management system (not shown). The database management system may be implemented by any one of a variety of different database management systems and embodiments of the invention are not limited to any particular database management system. For example, the database management system may be implemented by a conventional relational database management system (RDBMS). Alternatively, as another example, the database management system may be implemented using a "NoSQL" database management system or other database management system that differs from a traditional RDBMS in one or more respects. In one particular non-limiting embodiment, the database management system is implemented using a version of the Apache HBase database management system. In one embodiment, database 115 may be embodied as a collection of one or more file system files. For example, database 115 may be embodied as a collection of one or more files of an operating system. Alternatively, database 115 may be a file system itself. For example, database 115 may be a distributed file system such as, for example, the Apache Hadoop Distributed File System (HDFS).

In one embodiment, database 115 organizes data in a structure that is described using an ontology, embodied in a database schema, comprising a data model that is used to represent the structure and reason about objects in the structure. The ontology may define one or more object types, and each object type may have one or more properties. Optionally, the ontology is able to be changed by a user or administrator, and may be a reason for reindexing.

In one embodiment, client device 120 may be any kind of computing device including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Although a single client device 120 is shown in FIG. 1, any number of client devices may be present. Client device 120 is communicatively connected to dispatch server 105. Client device 120 may execute one or more software applications (not shown). The software applications may be general purpose applications, such as a web browser, spreadsheet application, or a customized application, such as an application for retrieving and analyzing data from a database. The software applications may be thin client or thick client. The software applications may send requests to dispatch server 105 in any manner and/or in any format now known or later developed. Specifically, the requests may include, but are not limited to: search requests, reindexing requests, aggregation requests, requests to store or edit information in database 115, etc.

In one embodiment, the index servers (e.g., index server1 125, index server 1A 130, index server 2, 135, and index server 2A 140) may be any computing and/or storage device(s) including, but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. The index servers (e.g., index server1 125, index server 1A 130, index server 2, 135, and index server 2A 140) may be located on one or more separate devices, on a single device, or some combination thereof.

In one embodiment, index server1 125 and index server2 135 are live index servers that include programming to respond to search requests from dispatch server 105. Index server 1 125 and index server2 135 may be any type of indexes. Specifically, index server1 125 and index server2 135 may each by a different type of index, with different strengths and weaknesses. For example, index server1 125 may be a search server that is optimized for searching text whether the text is structured or unstructured, such as full text searches. Specifically, index server1 125 may be an inverted index. Continuing the example, index server2 135 may be a horizon server optimized for searching objects, locations, and/or other types of information. Specifically, index server2 135 may be an in-memory column store. However, index server1 125 and index server2 135 may each be any type of index optimized for any type of search. In one embodiment, index server1 125 and index server2 135 may be different shards of the same index, and therefore may be optimized for the same type of searches.

As indicated by the dotted lines, index server1A 130 and index server 2A 140 are secondary, or "shadow," index servers that do not receive live search requests from dispatch server 105. Rather, index server 1A 130 and index server 2A 140 include a second, or new, index of their corresponding "live" index server. The second, or new, index may be partial or otherwise is in the process of being created. Once the second index is completed, index server 1A 130 and/or index server 2A 140 may be switched from a "shadow" state to a "live" state (such as by dispatch server 105 directing searches to index server 1A 130 and/or index server 2A 140, etc.), effectively replacing the corresponding live index servers (i.e., index server1 125 and index server2 135, respectively), and begin to respond to search requests from dispatch server 105 using the new index. Alternatively, rather than reconfiguring the shadow index servers to be live index servers, the newly generated index may be copied over to the live index server, and replace the "old" index, thereby removing the need to send subsequent requests to a different server.

Example Functional Implementation

Figure 2:
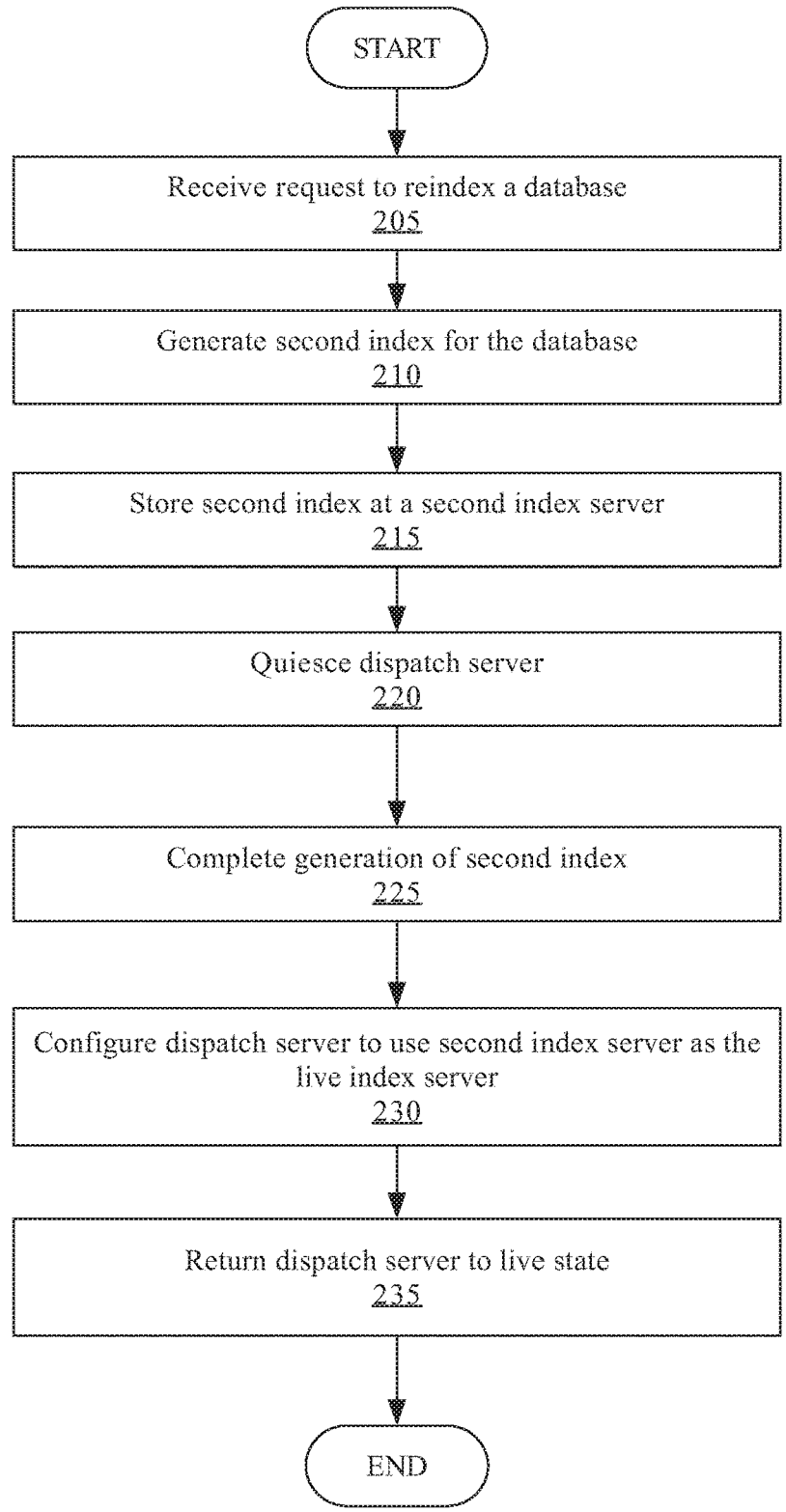
FIG. 2 shows a flowchart of a method in accordance with an embodiment of the invention.

FIG. 2 shows an example flowchart of a method for reindexing a database in a live environment. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 205, a request to reindex a database is received. The request may be received in any suitable manner and/or format. Specifically, the request is received from an administrator or other user of the database, and may contain specific instructions, such as a specified batch size and/or thread count to use when generating the new index. Alternatively, the request may be received from another process or other suitable source, and/or may not contain a specified batch size and/or thread count. In one embodiment, the request may be the result of defining a new ontology for the database, changing the number of shards in an index server, or any other suitable reason. In the event that the reindex request is based on a new ontology, the new ontology may be included in the request.

In step 210, a second index for the database is generated. Specifically, the second index for the database is generated while the database is live and servicing real requests from client devices. The second index may be generated, for example, by iterating through the information stored in the database, and processing the data to generate the second index. The second index, while containing the same or highly similar information to the "original" index, may be organized or structured in a different manner, such as by using a new ontology, or distributing the stored information across a different number of shards.

In step 215, the second index is stored at a second index server. The second index may be stored in any suitable manner. In one embodiment, the second index is stored in a commit log, to minimize use of server resources. Then, when the second index is completed, the second index server can use the commit log to generate an in memory representation of the second index. Alternatively, the second index may initially be stored in memory, or in any other suitable location, instead of in a commit log. While the second index is being stored at the second index server, the second index server is not live. In other words, the second index server will not and does not receive live search requests until, for example, step 235.

In step 220, the dispatch server is quiesced. The dispatch server may be quiesced, or paused, in any suitable manner. For example, the dispatch server may store any received requests in a buffer for later response, or may simply ignore all requests received while quiesced. By quiescing the dispatch server, the database will be able to maintain a steady state, allowing the generation of the second index to complete.

In step 225, generation of the second index is completed. The generation may be completed in any suitable manner. For example, the generation of the second index may be completed by finishing iterating through all of the information in the database, and subsequently storing the now completed second index at the second index server.

In step 230, the dispatch server is configured to use the second index server as a live index server. In response to the completion of the second index, or at any other time after the completion of the second index, the dispatch server is reconfigured to use the second index server as the live index server. In other words, search requests will now be sent to the second index server, and responded to using the new second index, instead of the first "original" index server. Alternatively, rather than reconfigure the dispatch server to use the second index server as a live index server, the newly generated second index may instead be copied over to the "original" index server, where the second index will replace the "original" index. Thus, the "original" index server will be updated with the second index, and reconfiguring the dispatch server to send requests to the second index server would be unnecessary.

In step 235, the dispatch server is returned to a live state. The dispatch server may be returned to a live state in any suitable manner. Once returned to a live state, the dispatch server will begin sending search requests to the second index server, which will return results based on the second index. Alternatively, as discussed in step 230, the dispatch server may still send search requests to the "original" index server in the embodiment where the second index is copied over to the "original" index server.

Example Use Case

Figure 3B:
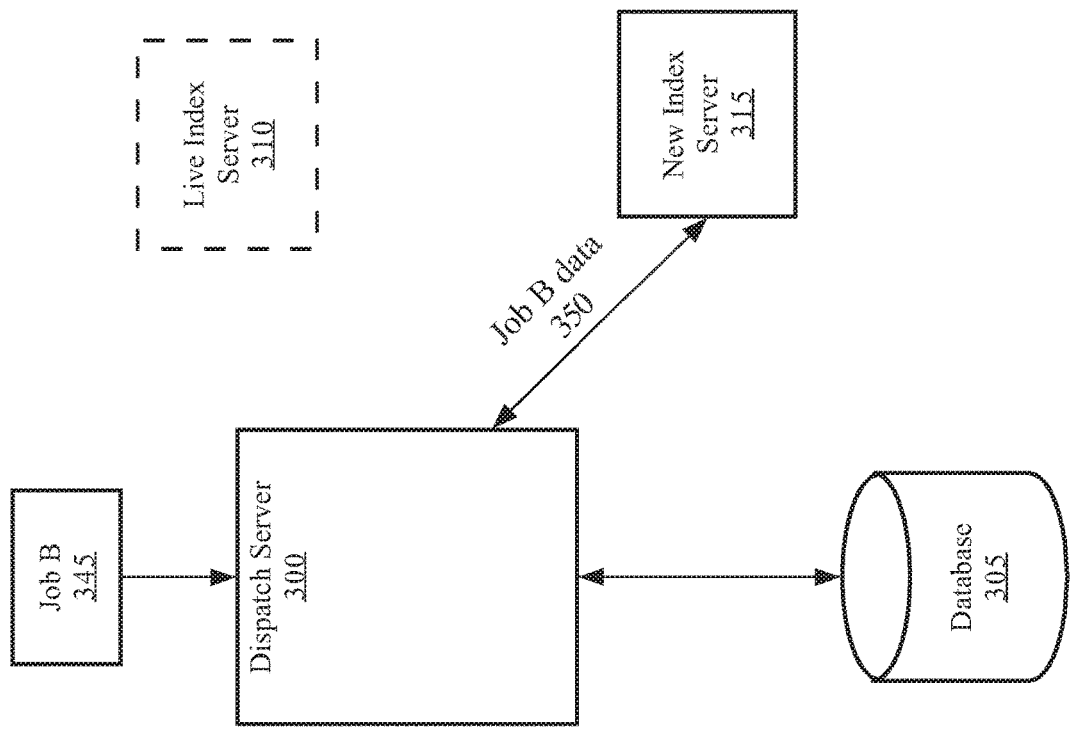
FIGS. 3A and 3B show an example in accordance with an embodiment of the invention.
Figure 3A:
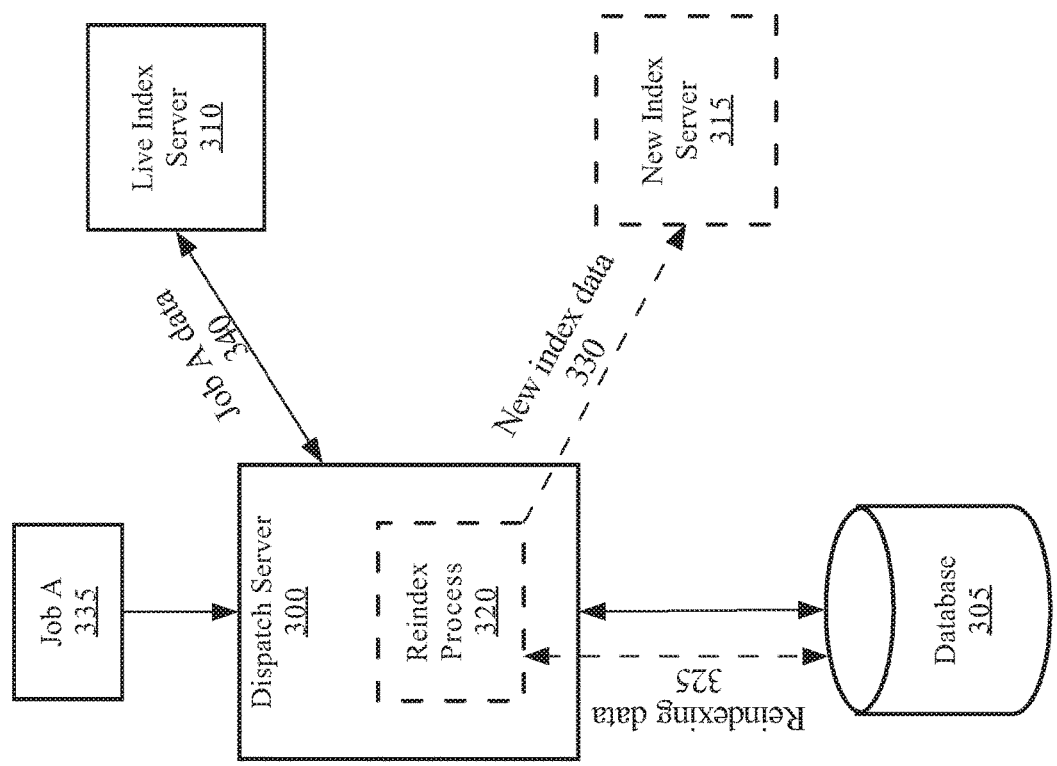

FIGS. 3A and 3B show an example use case of reindexing a database in a live environment. The example shown in FIGS. 3A and 3B has been simplified, to ease understanding and, as such, the example should not be construed to limit the disclosure to the specifics discussed below.

In FIG. 3A, an example system is shown, consisting of dispatch server 300, database 305, live index server 310, and new index server 315. Dispatch server 300 is a server responsible for handling requests from clients and generating a new index of database 305. Database 305 is a database for storing information which is indexed at live index sever 310. Live index server 310 is an index that is sent and responds to search requests from dispatch server 300. As indicated by the dotted lines, new index server 315 is a shadow index server that is not live. Rather, new index server 315 is used for storing a new index of database 305 as the new index is generated, and once the new index is completed, new index server 315 will be used as a live index server.

In FIG. 3A, dispatch server 300 has received a request to reindex database 305, and has begun reindex process 320 in response. Reindex process 320 proceeds to generate a new index with a limited batch size and thread count so that the performance of database 305 is not affected by the reindexing process. During the reindexing processes, communications comprising reindexing data 325 are exchanged between database 305 and dispatch server 300, and are then processed. Specifically, the reindex process 320 involves, in part, iterating through all of the information in database 305. As the reindex process 320 generates new index data 330, new index data 330 is sent to new index server 315 for storage. Simultaneously, job A 335 is received by dispatch server 300. In response, dispatch server 300 sends a search request with job A data 340 to live index server 310, which uses the current index to respond to the search request, and return a response. Thus, job A 335 is serviced using, at least in part, live index server 310 while a new index for database 305 is generated.

Eventually, reindex process 320 determines that for the generation of the new index to complete, dispatch server 300 needs to be quiesced. In response, reindex process 320 quiesces dispatch server 300, thereby temporarily halting any changes to database 305, and allowing the reindex process to complete. Subsequently, once the completed new index has been stored on new index server 315, reindex process, or an administrator or other user, reconfigures dispatch server 300 to use new index server 315 as the live index server. After the reconfiguration, the dispatch server 300 is returned to a live state, and the example continues in FIG. 3B.

FIG. 3B shows the same system as in FIG. 3A, but after the new index has been generated and dispatch server 300 has been reconfigured to use new index server 315 as a live index server. This is indicated in FIG. 3B through the now-dotted lines used to depict live index server 310 (in contrast to the solid lines of FIG. 3A), and the now-solid lines used to depict new index server 315 (in contrast to the dotted lines of FIG. 3A). Thus, when dispatch server receives job B 345, dispatch server 300 sends a search request with job B data 350 to new index server 315, which uses the new index to respond to the search request, and return a response. Thus, job B 345 is serviced using, at least in part, new index server 315. As live index server 310 is no longer in use, live index server 310 may be brought offline and/or used for another purpose.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
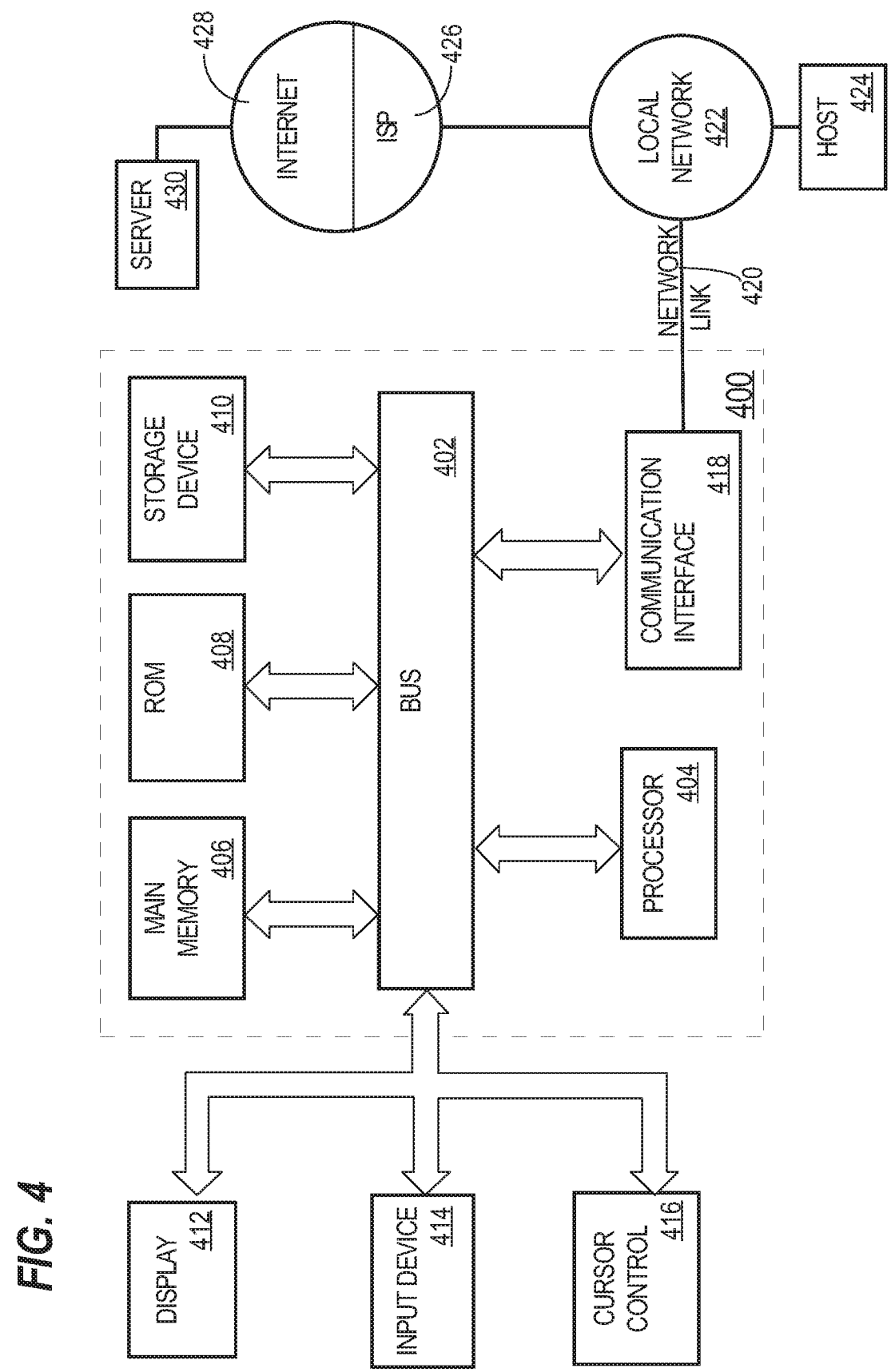
FIG. 4 shows a block diagram of a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   configuring a dispatch server to use a first index server as a live index server, the first index server comprising a first index of information that is stored in a database and responding to queries on the database from the dispatch server;
   receiving a request to reindex information in the database;
   based on the receiving the request to reindex information in the database, initiating a generation of a second shadow index of information in the database while the dispatch server continues to use the first index server as a live index server;

while the dispatch server is quiesced without receiving queries, completing the generation of the second shadow index; and based on the completing the generation of the second shadow index, configuring the dispatch server to use a second index server, that stores the second shadow index as a live index server.

2. The computer-implemented method of claim 1, further comprising:

generating the second shadow index of information based on iterating through information in the database.

3. The computer-implemented method of claim 1, wherein the completing the generation of the second shadow index is based on periodically iterating through information in the database until the second shadow index is up to date.

4. The computer-implemented method of claim 1, wherein the first index server is no longer used as a live index server while the second shadow index is used as a live index server.

5. The computer-implemented method of claim 1, wherein the request is associated with a new ontology for information in the database.

6. The computer-implemented method of claim 1, further comprising:

prior to the request, the first index server is composed of a first number of shards; and the request is associated with a change in the first number of shards of which the first index server to a second number of shards that is different than the first number of shards.

7. The computer-implemented method of claim 1, wherein the second index server operates on one or more devices on which the first index server operates.

8. The computer-implemented method of claim 7, further comprising:

writing a plurality of actions for generating the second shadow index to a commit log; and performing the plurality of actions in the commit log when configuring the dispatch server to use the second index server as a live index server.

9. The computer-implemented method of claim 1, further comprising:

generating the second shadow index based on a maximum batch size and a maximum thread count.

10. One or more non-transitory computer-readable media storing one or more programs, the one or more programs comprising instructions for:

configuring a dispatch server to use a first index server as a live index server, the first index server comprising a first index of information that is stored in a database and responding to queries on the database from the dispatch server;

receiving a request to reindex information in the database;

based on the receiving the request to reindex information in the database, initiating a generation of a second shadow index of information in the database while the dispatch server continues to use the first index server as a live index server;

while the dispatch server is quiesced without receiving queries, completing the generation of the second shadow index; and based on the completing the generation of the second shadow index, configuring the dispatch server to use a second index server that stores the second shadow index as a live index server.

11. The one or more non-transitory computer-readable media of claim 10, the one or more programs further comprising instructions for:

generating the second shadow index of information based on iterating through information in the database.

12. The one or more non-transitory computer-readable media of claim 10, wherein the completing the generation of the second shadow index is based on periodically iterating through information in the database until the second shadow index is up to date.

13. The one or more non-transitory computer-readable media of claim 10, wherein the first index server is no longer used as a live index server while the second shadow index is used as a live index server.

14. The one or more non-transitory computer-readable media of claim 10, wherein the request is associated with a new ontology for information in the database.

15. The one or more non-transitory computer-readable media of claim 10, the one or more programs further comprising instructions for:

prior to the request, the first index server is composed of a first number of shards; and the request is associated with a change in the first number of shards of which the first index server to a second number of shards that is different than the first number of shards.

16. The one or more non-transitory computer-readable media of claim 10, wherein the second index server operates on one or more devices on which the first index server operates.

17. The one or more non-transitory computer-readable media of claim 16, wherein the one or more programs further comprising instructions for:

writing a plurality of actions for generating the second shadow index to a commit log, wherein the plurality of actions is not performed; and performing the plurality of actions in the commit log when configuring the dispatch server to use the second index server as the live index server.

18. The one or more non-transitory computer-readable media of claim 10, the one or more programs further comprising instructions for:

generating the second shadow index based on a maximum batch size and a maximum thread count.

19. A system comprising:

one or more processors;

a memory storing one or more programs configured for execution by the one or more processors, the one or more programs comprising instructions for:

configuring a dispatch server to use a first index server as a live index server, the first index server comprising a first index of information that is stored in a database and responding to queries on the database from the dispatch server;

receiving a request to reindex information in the database;

based on the receiving the request to reindex information in the database, initiating a generation of a second shadow index of information in the database while the dispatch server continues to use the first index server as a live index server;

while the dispatch server is quiesced without receiving queries, completing the generation of the second shadow index; and based on the completing the generation of the second shadow index, configuring the dispatch server to use a second index server that stores the second shadow index as a live index server.

20. The system of claim 19, the one or more programs further comprising instructions for:
    generating the second shadow index of information based on iterating through information in the database.

* * * * *